Dec. 5, 1967 I. B. CRILLY 3,356,298

ODOMETER

Filed Sept. 29, 1966

INVENTOR.
IRA B. CRILLY

BY
Lindsey, Prutzman and Hayes
ATTORNEYS

United States Patent Office 3,356,298
Patented Dec. 5, 1967

1

3,356,298

ODOMETER

Ira B. Crilly, Simsbury, Conn., assignor to Veeder-Industries Inc., Hartford, Conn., a corporation of Connecticut Filed Sept. 29, 1966, Ser. No. 582,979
9 Claims. (Cl. 235—95)

ABSTRACT OF THE DISCLOSURE

A pendulum type hub odometer having a primary pendulum with a cylindrical outer surface and a damping hoop of greater diameter freely resting on the outer surface to frictionally prevent rotation of the primary pendulum.

Figure 1:
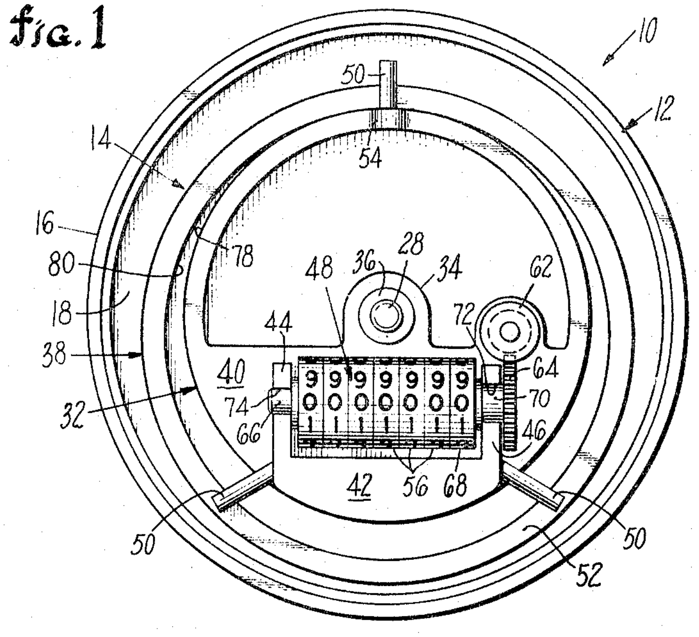

The present invention relates to hub mounted odometers. More particularly it is directed to a new and improved hub odometer of the pendulum type adapted for recording the revolutions of a rotating unit such as the wheel of a truck, bus, automobile, or the like.

Extensive efforts in the odometer industry have been directed toward the production of a hub odometer capable of rendering prolonged, accurate and trouble-free operation. Of principal concern with respect to the pendulum type odometers is the resistance which the pendulous portion exhibits toward the rotational forces necessarily encountered during operation. More specifically, it is known that road irregularities and other disturbances tend to impart to the pendulous portion of the odometer forces which result in the typical oscillatory or back and forth swinging motion of a pendulum. As can be appreciated, the oscillatory motion thus produced coupled with the rotational forces set up by the high speed rotation of the hub can build up a tangential force component which is of sufficient strength to cause the pendulum to completely rotate. Once the rotation of the pendulum is initiated, the continued operation of the rotating unit will normally effectuate continuation thereof for prolonged periods unless interrupted by an opposing force. Since the accurate operation of the odometer depends upon the suspended nonrotation of the pendulous portion for properly recording the revolutions of the rotating unit, it is extremely important that the odometer exhibit not only a low tendency for rotation but also an ability to terminate any rotation which might accidentally be initiated.

Accordingly, it is a principal object of the present invention to provide a new and improved hub odometer of the pendulum type which incorporates a constantly operative, rotation dampening force capable of preventing both the initiation of rotation by the pendulum and the continuous rotation thereof if such rotation is inadvertently set up within the mechanism.

Another object of the present invention is to provide a new and improved hub odometer having pendulous elements of different inertia characteristics whereby the torque or tangential force applied to one of the elements will be counteracted by the inertia characteristics of the other element coupled with a dissipating transfer of rotational energy and a resultant stabilization of the hub odometer.

A further object of the present invention is to provide a hub odometer of the type described which is simple, compact, and durable in construction while at the same time providing consistent, reliable, and accurate operation.

Other objects will be in part obvious and in part pointed out more in detail hereinafter.

The invention accordingly consists in the features of construction, combination of elements and arrangement of parts which will be exemplified in the combination hereafter set forth, and the scope of the application which will be indicated in the appended claims.

2

Figure 2:
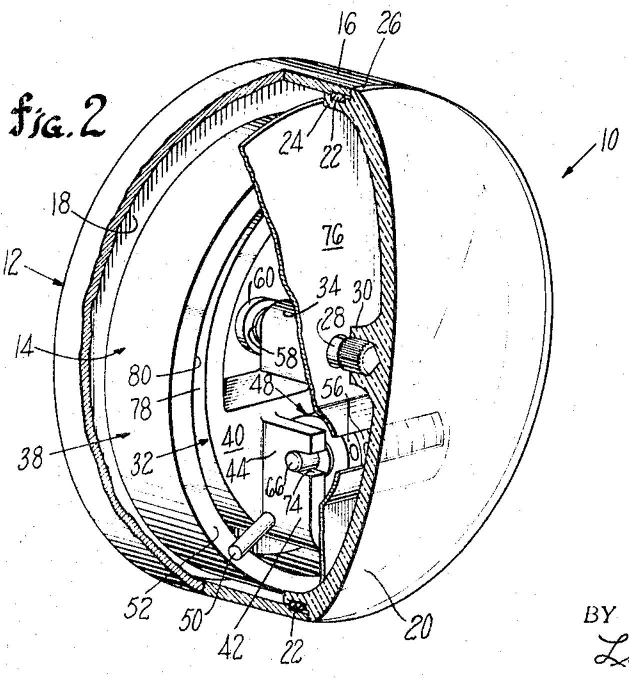

In the drawings:

FIG. 1 is a front view of a hub odometer embodying the present invention with the face plate removed therefrom; and FIG. 2 is a perspective view, partially broken away and partially in section, of the hub odometer of FIG. 1.

Referring now to the drawing in greater detail wherein like referenced characters indicate like parts throughout the figures there is shown a hub odometer of the pendulum type, generally designated 10. The hub odometer 10 is similar in operation and construction to the apparatus described and claimed in U.S. Patent No. 3,198,430 issued Aug. 3, 1965 to Robert Hermann and entitled "Hubodometer." As in that patent, the odometer of the present invention comprises a casing 12 adapted for mounting on a wheel hub (not shown) and a counter supporting pendulous mechanism, generally designated 14, mounted within the casing 12 for gravity actuated rotation relative to the casing. In the embodiment illustrated the casing 12 takes the form of a shallow tubular member comprising a generally cylindrical body portion 16 and an integral back plate 18 enclosing one end of the body portion and forming a housing for the pendulous mechanism 14. The housing of the casing 12 is enclosed at its forward end by a front plate or window 20 which is secured to the body portion 16 in such a manner as to prevent dirt or other foreign matter from seeping into the housing and adversely affecting the internal mechanism. Typical of the sealing means which may be employed as the O ring gasket 22 (FIG. 2) compressively held between the body portion 16 and the circular flange 24 extending rearwardly from the front window 20 adjacent its outer edge 26. The window 20 is further secured to the housing through the cooperative fixed interengagement of the axial, pendulum supporting shaft 28 with both the back plate 18 and the central rearwardly extending boss 30 of the window. In the preferred embodiment the casing 12 is adapted for facile mounting on a rotatable unit such as the hub of a vehicle wheel and when so assembled will rotate with the hub to actuate the counting mechanism and record the rotation of the wheel.

In accordance with the present invention the pendulous mechanism 14 comprises a generally cylindrical primary pendulum 32 having a central journal 34 supported on the shaft 28 through the bearing 36 and an enlarged secondary ring pendulum 38 resting on but independent of the primary pendulum 32. As shown, the weighted base portion 40 of the primary pendulum 32 is positioned below the supporting shaft 28 in order to locate the center of gravity of the pendulum at a position substantially below the pivot point thereof and to impart thereto the desired moment of inertia. The base portion 40 is provided with a forwardly extending, counter supporting frame 42 having a pair of spaced side plates 44, 46 adapted to receive the counter 48 for recording the relative rotation between the casing 12 and the pendulous mechanism 14. The frame 42 additionally carries a pair of spaced retaining pins 50 extending outwardly of the pendulum 32 a sufficient distance to contact one edge 52 of the secondary pendulum 38 for maintaining the desired positional relationship between the pendulums. As shown, a third retaining pin 50 may also be secured within the apertured boss 54 located at the apogee of the cylindrical primary pendulum 32.

The number wheels of the counter 48 are sequentially advanced during rotation of the casing 12 by means of a ratcheting mechanism described in greater detail in the aforementioned U.S. Patent No. 3,198,430. Upon rotation of the casing 12 by the hub of the vehicle wheel the cam surface 58 affixed to the interior of the back plate 18 acts on the cam follower 60 to suitably actuate the worm 62. The worm, in turn, rotates worm gear 64 affixed to the counter wheel supporting shaft 66 thereby driving the lowest order number wheel 68 of the counter 48. The hub 70 of the worm gear 64 is, as shown, supported within the open sided bearing slot 72 of the side plate 46 while the opposite end of the wheel supporting shaft 66 is positioned in the smaller, axially aligned bearing slot 74 within the parallel side plate 44. It will of course be appreciated that the count is transferred from the lowest order number wheel 68 to the higher order number wheels 56 of the counter 48 in a conventional manner in order to properly record the monitored rotation of the vehicle wheel. An apertured cover plate 76 secured to the primary pendulum 32 is additionally provided to facilitate read out of the appropriate indicia on the number wheels of the counter 48.

The primary pendulum 32 of the pendulous mechanism 14 is provided with a smooth, arcuate, generally cylindrical, outer peripheral surface 78 concentric with the axis of the pendulum supporting shaft 28. In the embodiment illustrated the width of the surface 78 is shown as being slightly greater than one-half the total depth of the pendulous mechanism 14. However, it will be appreciated that the width may vary so long as the desired pendulum dampening action is attained.

The secondary pendulum 38 which rests on surface 78 of pendulum 32 is a cylindrical ring-like member equal in width to surface 78 and of substantially uniform thickness along its entire extent. The pendulum 38 is provided with an arcuate inner surface 80 of substantially greater diameter than surface 78 but complementary thereto whereby the respective surfaces are in slidable frictional contact. As a result of its increased diameter the inner surface 80 of the secondary pendulum 38 is eccentric to the axis of the pendulum supporting shaft 28 and will rotate only by the constant or continuous travel of its effective pivot point around the peripheral outer surface 78 of the primary pendulum 32. In other words, rotation of the ring pendulum 38 is effectuated in much the same manner as the rotation of a hoop by a drive member of appreciably smaller diameter, such as a stick. As can be appreciated, in order to provide full rotation of the hoop-like ring pendulum 38 it is required that the driving member, namely the entire primary pendulum 32, move along or transcribe a circular path rather than merely rotate about its own fixed axis. Additionally, the secondary pendulum 38 will exhibit a moment of inertia which is quite different from that of the primary pendulum although, like the primary pendulum, its center of gravity is positioned below the axis of shaft 28. Accordingly, due to the substantially different inertia characteristics of the pendulums 32, 38 comprising the mechanism 14 there is a natural lack of synchronism between the rotational movements thereof whereby the abutting surfaces of the pendulums product a frictional drag or dampening effect which tends to stabilize the entire pendulous mechanism 14 and maintain it in a nonrotating condition.

As can be appreciated from the foregoing detailed description the hub odometer of the present invention is a compact, easily assembled device capable of rendering accurate and reliable odometric monitoring of a rotatable unit such as a vehicle wheel or the like. The dual pendulum construction is constantly operative to prevent undesirable rotation of the pendulous mechanism of the odometer through the frictional contact between the concentric outer surface of the primary pendulum and the eccentric inner surface of the hoop-like or secondary ring pendulum. Additionally, the different inertia characteristics of the respective pendulums are such that any inadvertent rotation set up within the pendulous mechanism is quickly and effectively halted by a dissipating transfer of rotational energy from the primary to the secondary pendulum together with a resultant stabilization of the primary pendulum and a more accurate recording of the rotation of the rotatable unit.

As will be apparent to persons skilled in the art, various modifications and adaptations of the structure above described will become readily apparent without departure from the spirit and scope of the invention, the scope of which is defined in the appended claims.

The embodiments of the invention in which an exclusive property or privilege is claimed are defined as follows:

1. An odometer of the pendulum type having a register adapted for monitoring the operation of a rotatable unit comprising a rotatable gravity actuated primary pendulum mounting the register and having a weighted body portion adapted to urge the pendulum toward a rest position, said body portion being positioned at rest below the axis of rotation of the pendulum; and an independently rotatable secondary pendulum of different inertia characteristics than the primary pendulum, one of said pendulums having an arcuate outer peripheral surface while the other is provided with an arcuate inner surface of greater radial dimensions than said outer surface, the inner surface being mounted on the outer surface in frictional contact therewith at the top thereof whereby the frictional drag between the surfaces dampens the relative rotation of the respective pendulums thereby preventing continuous full rotation thereof during the operation of the rotatable unit.

2. The odometer of claim 1 wherein at least one of said outer and inner surfaces is eccentric to the axis of rotation of the primary pendulum.

3. The odometer of claim 1 wherein the outer peripheral surface is on the primary pendulum and is concentric with the axis of rotation of said primary pendulum.

4. The odometer of claim 3 wherein said outer surface is generally cylindrical and said secondary pendulum is a hooplike member circumscribing said primary pendulum.

5. The odometer of claim 4 including retaining means for maintaining the secondary pendulum in circumscribing relationship to the primary pendulum, and a casing enclosing the pendulums and having a window therein for viewing the register, the inner surface of the secondary pendulum defining a cylinder eccentric to said axis of rotation and of greater diameter than the outer surface of said primary pendulum, said secondary pendulum having a substantially uniform cross section along its extent.

6. In an odometer adapted to be mounted on a rotatable member and having a pendulum with a counting device for registering the amount of rotation of the rotatable member and with damping means for damping its movement, the improvement wherein the damping means comprises a generally circular surface substantially coaxial with the rotatable member with the odometer mounted thereon and a generally circular ring with a diameter different than the diameter of said circular surface and mounted in engagement with said circular surface in interfitting eccentric relationship therewith.

7. In an odometer adapted to be mounted on a rotatable member and having a pendulum with a counting device for registering the amount of rotation of the rotatable member and with damping means for damping its movement, the improvement wherein the damping means comprises a generally circular external surface and a generally circular ring with a diameter greater than the diameter of said circular surface and supported in engagement with said circular surface in interfitting eccentric relationship therewith for planetary rotational movement thereabout.

8. In an odometer adapted to be mounted on a rotatable member and having a pendulum with a counting device for registering the amount of rotation of the rotatable member and with damping means for damping its movement, the improvement wherein the damping means comprises a generally circular surface and a generally circular ring with a diameter substantially equal to but different than the diameter of said circular surface and mounted in engagement with said circular surface in interfitting eccentric relationship therewith.

9. In an odometer adapted to be mounted on a rotatable member and having a pendulum with a counting device for registering the amount of rotation of the rotatable member and with damping means for damping its movement, the improvement wherein the damping means comprises a generally circular surface and a generally circular ring with a diameter different than the diameter of said circular surface and mounted in eccentric relationship with the rotatable member with the odometer mounted thereon for planetary rotational movement about the axis of rotation of said rotatable member.

References Cited

UNITED STATES PATENTS

| | | | |
|---|---|---|---|
| 2,638,274 | 5/1953 | Engler | 235—95 |
| 3,130,907 | 4/1964 | Coffey | 235—95 |
| 3,198,430 | 8/1965 | Hermann | 235—95 |

RICHARD B. WILKINSON, *Primary Examiner.*

STANLEY A. WAL, *Assistant Examiner.*